UNITED STATES PATENT OFFICE.

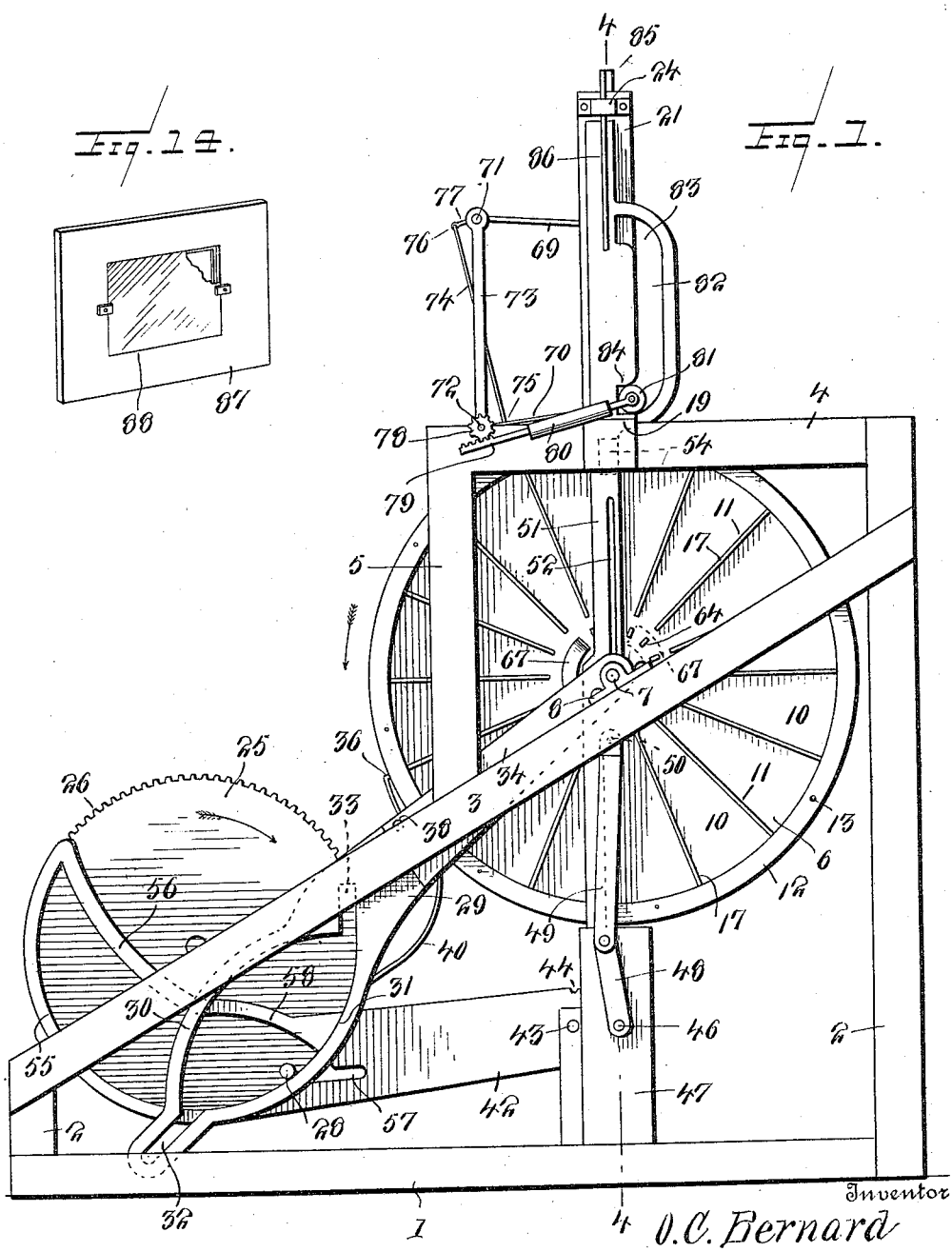

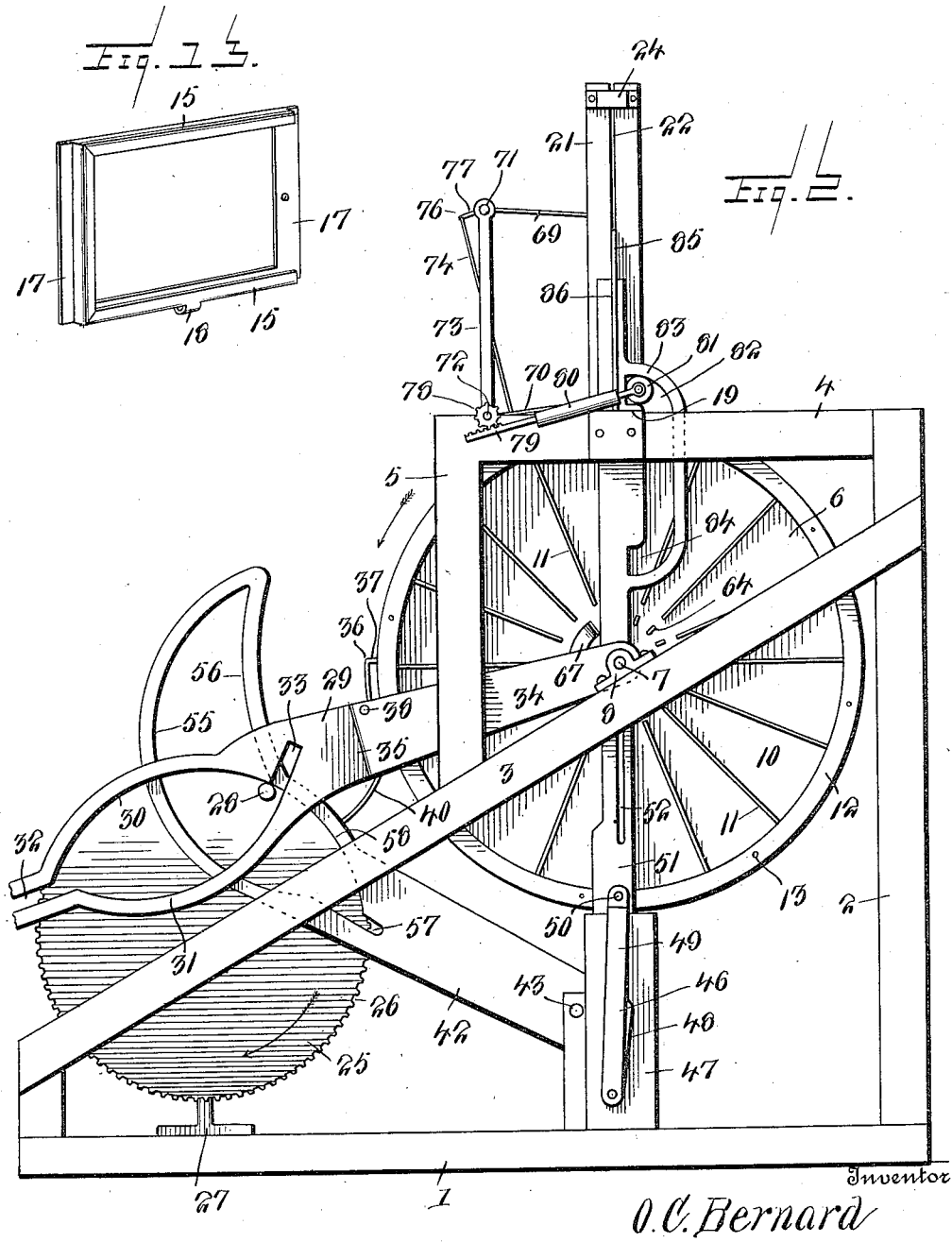

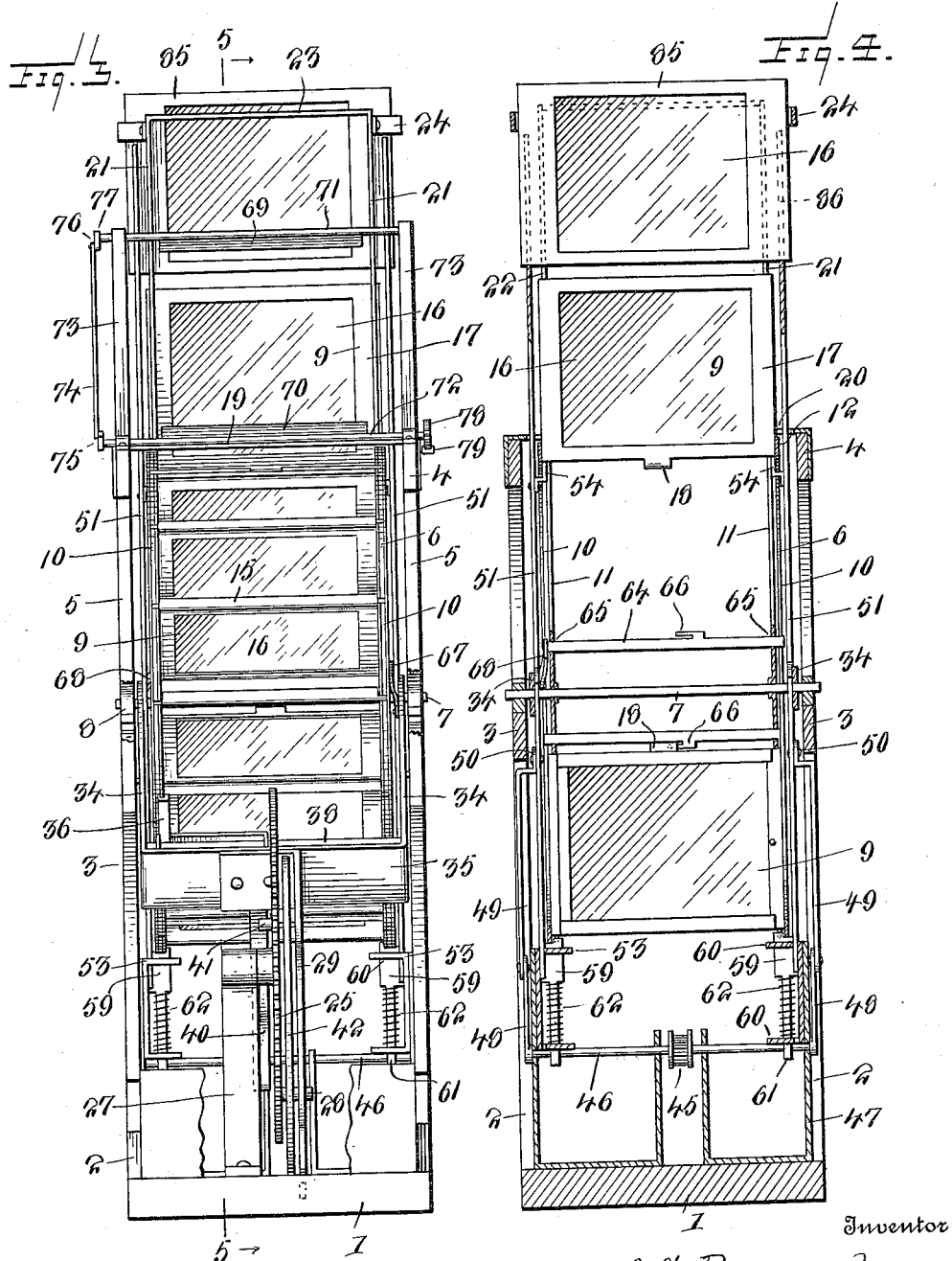

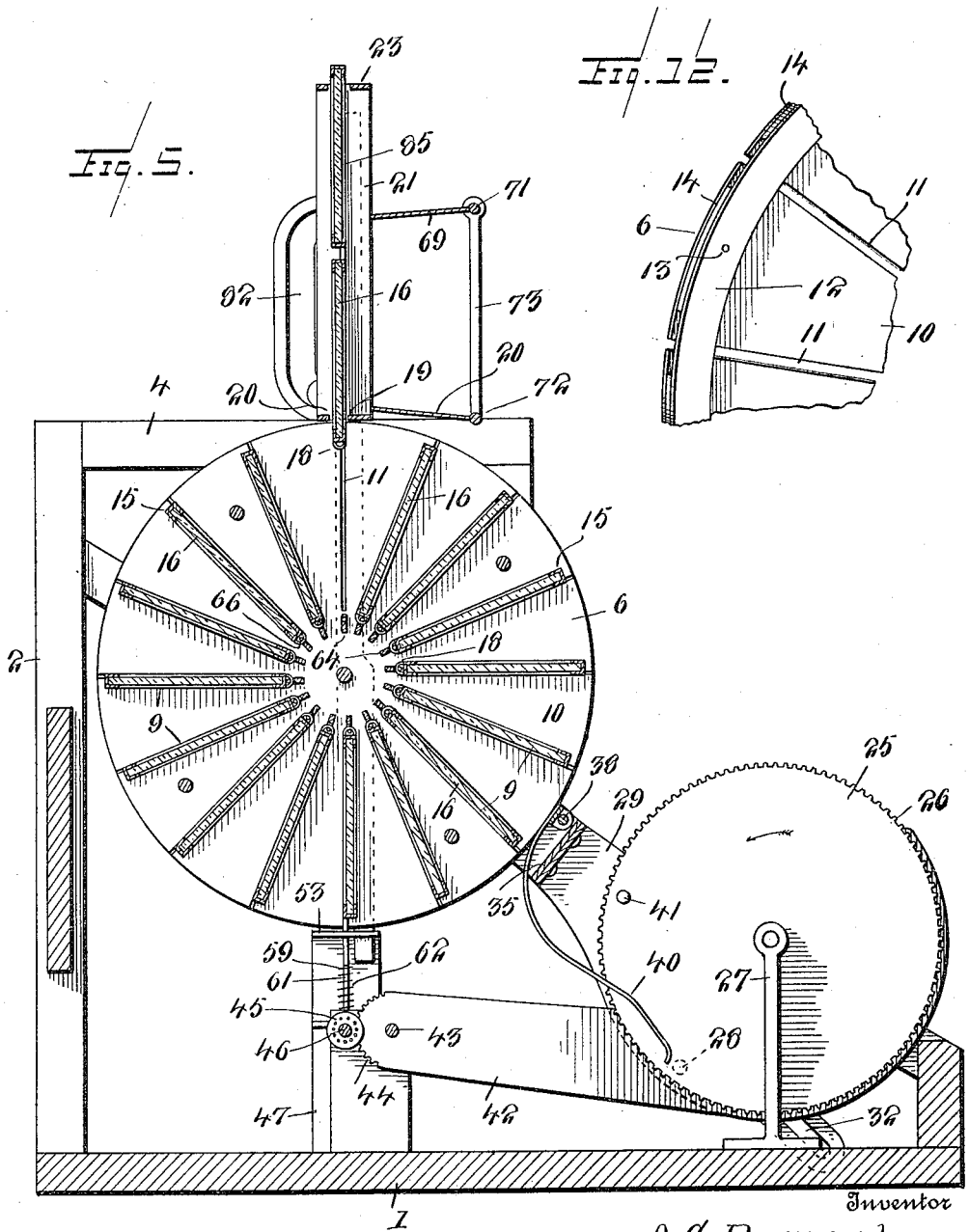

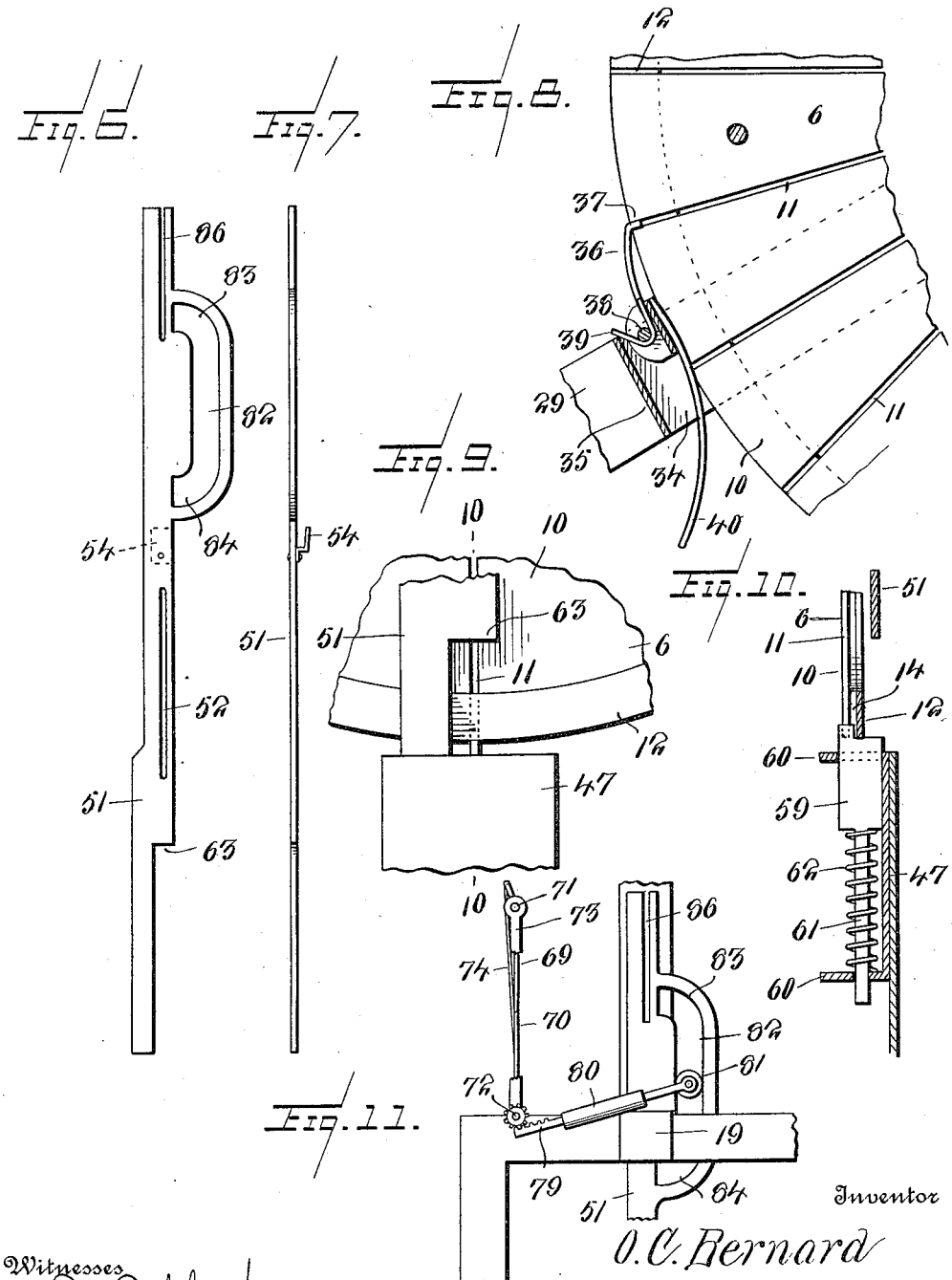

OSCAR C. BERNARD, OF EL PASO, TEXAS.

ADVERTISING DEVICE.

1,069,521.

Specification of Letters Patent.

Patented Aug. 5, 1913.

Application filed September 11, 1912. Serial No. 719,825.

*To all whom it may concern:*

Be it known that I, OSCAR C. BERNARD, a citizen of the United States, residing at El Paso, in the county of El Paso and State of Texas, have invented new and useful Improvements in Advertising Devices, of which the following is a specification.

This invention relates to automatic advertising devices, the object in view being to provide a machine constantly operated from and by a suitable motor, which will display in succession a series of slides, either in the form of pictures, photographs, negatives, or lantern slides, the machine being adapted to display such slides either in the day time or at night.

A further object of the invention is to provide in connection with such machine, a shutter which operates automatically to intermittently display the slides; and this shutter may be used either with or without a light transmitting device, which, when used in conjunction with the slides, will more brilliantly display the same to the gaze of the public.

Furthermore, it is practicable to use, in conjunction with the machine hereinafter described, a lens for projecting the image of the slide upon a screen at a distant point, the machine acting automatically, after once being set in motion, and displaying the slides successively, without any further attention on the part of the operator.

A further object of the invention is to provide in connection with the successively displayed slides, a master slide which is displayed every time one of the slides of the series in the magazine is brought into view, with the object of impressing the contents of the master slide upon the observers.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of the advertising device, embodying the present invention, showing the slide lifters raised. Fig. 2 is a similar view, showing the slide lifters depressed. Fig. 3 is an end elevation of the machine. Fig. 4 is a vertical transverse section through the machine on the line 4—4 of Fig. 1. Fig. 5 is a vertical longitudinal section through the machine on the line 5—5 of Fig. 3. Fig. 6 is a side elevation of one of the slide lifters. Fig. 7 is an edge view thereof. Fig. 8 is a detail vertical longitudinal section, showing a portion of the magazine and the dog which feeds the magazine. Fig. 9 is a detail side elevation of a portion of the magazine, showing also a portion of one of the slide lifters, and the guide therefor. Fig. 10 is a detail vertical cross section through the same parts. Fig. 11 is a detail side elevation of the upper portion of the machine, showing the shutter and its operating mechanism. Fig. 12 is a detail perspective view of a portion of the magazine, illustrating the guide ways for the slides. Fig. 13 is a detail view of one of the plate holders or slides. Fig. 14 is a similar view, showing a modified form of slide or holder.

The advertising display machine contemplated in this invention comprises a suitable frame, embodying a base 1, uprights 2 at the corners thereof, inclined frame bars 3 at opposite sides, top longitudinal bars 4, and uprights 5 extending from the top bars 4 downwardly to the inclined frame bars 3, the frame comprising in addition to the bars hereinabove mentioned suitable cross connecting or tie bars arranged at suitable places, so as to admit of the free movement of the mechanical working parts of the machine, hereinafter particularly described.

6 designates a revolving magazine mounted on a central shaft 7 journaled in bearings 8 secured to the frame bars 3, as shown. This magazine is adapted to contain any desired number of slides 9 which are mounted to move radially with respect to the center of the magazine, as clearly shown in several figures of the accompanying drawings, the magazine embodying the oppositely arranged heads 10 formed with radial slots or guide ways 11, and braced or reinforced along the outer periphery thereof by means of annular bands or hoops 12. These hoops or bands are arranged upon the outer sides of the heads of the magazine, and are riveted or otherwise secured thereto, as shown at 13, segmental spacing pieces or blocks 14 being interposed between said hoops or bands and the heads of the magazine, so as to maintain the proper distance between said parts, to allow for the free sliding movement of the opposite outer edges of the slides.

It will be observed by reference to Figs. 13 and 14 that each slide or plate holder is constructed of a sheet metal blank, cut away to form a central rectangular opening for the display of the slide or picture, said holder or slide having outer and inner flanges 15, beneath which the top and bottom edges of the plate 16 are caught, while the opposite side edges 17 are left flat, so as to readily slide outward and inward in the guide ways 11 of the magazine. Each plate holder or slide is further provided at its inner side with a keeper 18, the purpose of which will hereinafter appear.

Supported upon the upper portion of the frame of the machine is a receiver for the slides, the same comprising a bottom plate 19 which extends across the top of the frame work and connects the horizontal bars 4. This plate 19 is provided with a slot 20, through which each of the slides is adapted to move, and also comprises the upstanding vertical side portions 21 provided with the guide ways 22 to receive the side edges of each plate holder or slide. These uprights are connected at the top by one or more cross bars 23, and may be further braced at one or more intervals in the length thereof by the U-shaped connectors or ties 24.

The magazine, by the means hereinafter described, is intermittently operated or partially revolved, and is brought to rest with the guide ways 11 at the top thereof in line with the guide ways of the receiver located above the same, so that the top-most slide may be projected upward above the magazine, and into the receiver, where it is displayed to the bystanders.

The mechanism for imparting intermittent movement to the magazine comprises a master gear or drive wheel 25 provided with teeth 26 adapting it to mesh with a pinion or gear wheel on a suitable prime mover, such as an electric motor, by means of which constant and uniform rotative movement is imparted to said drive wheel. This drive wheel 25 is mounted to revolve in suitable bearings 27, and is provided at one side with a laterally projecting lever-actuating pin 28 which works in conjunction with two levers, each of which will be hereinafter particularly described.

29 designates the feed dog actuating lever, which is journaled at one end on the shaft 7 of the magazine. The other end of said lever is expanded in width, and formed with an opening therein somewhat elliptical in shape, as best illustrated in Fig. 2, the same comprising the oppositely bowed portions, forming dwell faces 30 and 31, a dog lifting slot 32 at one end of the dwell faces, and a dog depressing slot 33 at the opposite end of the dwell faces. It will be observed by tracing the movements of the pin 28 and the lever 29, that a back and forth movement is imparted to said lever, and a dwell given thereto, both at the upper limit and lower limit of movement of said lever.

The inner portion of the lever is bifurcated or provided with oppositely arranged branches 34 which straddle the magazine, as shown, and are journaled on the shaft 7, and secured to the inner face of the crown 35 of said lever is a feed dog 36 having an inwardly projecting lip 37 adapted to engage in the outer extremity of any guide way 11 of the magazine, as illustrated in Fig. 8. The dog is fulcrumed on a pin 38, and is normally pressed toward the periphery of the magazine by means of a spring 39. The dog is also provided with a trip lever or tail piece 40 which is actuated or pressed inwardly toward the magazine by means of a dog tripping pin or shoulder 41, projecting from the opposite side of the master gear or drive wheel 25, above described, and as illustrated in Fig. 5, wherein it will be observed that as the pin 41 moves downward in the direction of the arrow, it will operate on the tail piece or trip lever of the dog, and thereby rock the engaging lip of the dog out of engagement with the magazine, allowing the lever 29 to again move upward, preparatory to a reëngagement of the dog and the magazine for another feeding or intermittent movement of the latter.

The mechanism for projecting the slides from the magazine embodies a slide lifting lever 42 which is journaled on a pin 43 connected with the frame of the machine, said lever being provided at one end with a gear segment 44 which meshes with a pinion 45. This pinion is mounted fast on a rock shaft 46 which extends through suitable bearing standards 47 connected to the base 4, said shaft being provided at its opposite ends with crank arms 48. From these crank arms, links 49 extend upward and are pivotally attached at their upper ends, as shown at 50, to a pair of oppositely arranged vertically movable slide lifters 51, each of which is slotted, as shown at 52, to embrace the shaft 7 and permit the lifter to slide upward and downward relatively thereto. At its lower end, each slide lifter passes through a guide flange 53 at the upper end of one of the bearing standards 47 just hereinabove referred to, and as illustrated in Figs. 2 and 5.

By reference to Figs. 6 and 7, it will be observed that each of the slide lifters 51 is provided upon its inner side with a plate lifting shoulder 54. As the slide lifter moves upward, it comes into contact with the bottom of the slide, as shown in Fig. 4. As two of such slide lifters are employed, it will be seen that the slide is moved upward in a rectilinear path, and is projected partially from the magazine through the slotted bottom of the receiver, as shown in Fig. 5, so as to be displayed to the public. As the slide lifters again move downward, the slide also moves downward by gravity and returns to its initial position in the magazine.

By now referring to Figs. 1 and 2, it will be observed that the lever 42 is expanded at its outer end and provided with a cam way, comprising a concaved dwell face 55, a convex slide depressing face 56, and a slide lifting slot 57 at the inner end thereof. These faces working in conjunction with the pin 28 on the master gear or drive wheel effect a back and forth rocking movement of said lever, and a dwell when the lever is in its lowermost position. The lever is also provided with an additional concaved dwell face 58 which will permit said lever to rest or dwell when at the upper limit of its movement. Therefore, the slide is allowed to rest for a predetermined period of time both at the upper limit of its movement and at the lower limit thereof.

When the magazine is at rest, it is held locked by means of a pair of latches 59 mounted to slide in suitable guides 60, as shown in Figs. 3, 4 and 10, each latch being provided with a downwardly extending stem 61 surrounded by a coiled expansion spring 62 which serves to hold the latch normally upward in engagement with one of the guide ways 11 of the magazine, as shown in Fig. 10. Each slide lifter is provided at a suitable point with a transverse trip shoulder 63 which, as the slide lifter reaches its lowermost position, depresses the adjacent latch 59 and forces the same downward out of interlocking engagement with the magazine. Just after this takes place, the feed dog 36 begins to pull downward on the magazine and proceeds far enough to move the magazine a distance equal to the distance between the guide ways 11 at their outer ends. This has the effect of advancing the next slide to a position in line with the receiver, wherein it is subsequently displayed. I also provide mechanism for locking the slides in the magazine to prevent the same from falling out of the magazine, when in their lowermost positions, and also releasing or unlocking said slides, preparatory to their being elevated into the receiver or displaying frame. This mechanism consists of a plurality of horizontally disposed and longitudinally shiftable locking bolts 64, each of which is mounted at its opposite ends in guide openings 65 in the heads of the magazine. As many bolts 64 are used as there are slides, and the bolts are arranged immediately adjacent to the inner portions of the slides. Each bolt is provided with a pin 66 extending in the direction of length of the bolt and adapted to be moved into and out of engagement with the keeper on the slide, hereinabove described.

Secured to the frame, at one side of the magazine, is a locking cam 67, while a corresponding releasing cam 68 is secured to the frame at the opposite side of the magazine. Now, as a plate approaches the point where it is to be operated upon by the slide lifters, the cam 68 operates against one end of the lock bolt 64 to move the latter lengthwise and release the slide, which is then carried upward by the slide lifters. Just after said slide is returned to its normal position, the other locking cam 67 acts to thrust the bolt in the opposite direction, and thereby again locks the slide in the magazine, so as to prevent any possibility of such slide falling out of the magazine by gravity, when it reaches a position below the center of rotation of the magazine. It will thus be observed that each slide is released and subsequently locked adjacent to the point of elevation of such slide. The mechanism for accomplishing this result is entirely automatic in action.

In order to make the machine as a whole more attractive, and in order to conceal the shifting of the slides into and out of the displaying frame or receiver, I provide a shutter, as shown in the drawings, and as best illustrated in Fig. 11, said shutter comprising two shutter sections 69 and 70, mounted on parallel horizontal shafts 71 and 72, respectively, said shutters being shown closed in Fig. 11 and open in Fig. 5, the shafts 71 and 72 being supported in suitable bearings on a shutter frame 73. A connecting rod 74 is pivotally attached, at 75, to one of the shutter sections, and is pivotally connected, at 76, to an extension 77 on the other shutter section, said link serving to cause both shutter sections to move open or shut simultaneously.

The lower shaft 72 is provided with a pinion 78 fast thereon, and which is actuated by a slidable rack bar 79 movable through a guide 80 on the machine frame, said rack carrying at its opposite end an anti-friction roller 81 which moves in a guide way or slot 82 forming an extension of one of the slide lifters 51. By reference to Fig. 11, it will be observed that the slot 82 has its upper and lower ends deflected, as shown at 83 and 84, so that the shutter sections 69 and 70 are operated both at the upper and lower limits of movement of the slide lifters, for the purpose of displaying the slide which has previously been projected from the magazine, and also a master slide 85 which remains permanently in the display or receiver frame, and is pushed upward by the underlying slide projected from the receiver, as shown in Fig. 5. The master slide 85 returns by gravity to the bottom of the receiver or display frame, when the slide projected from the magazine is allowed to return to its normal position in the magazine, all of which will be clearly understood by reference to Fig. 5.

From the foregoing description, it will now be seen that the master slide 85 always remains in the display frame, and by means of the double operation of the shutter sections 69 and 70, the master slide 85 is displayed once for each magazine slide which is displayed in the receiver frame. This is the feature which particularly adapts this machine for advertising purposes, in that any picture, printed matter, or information, which it may be desirable to impress upon the public, may be displayed with much greater frequency than the slides carried in the magazine.

Instead of pushing the master slide upward by means of the slide projected from the magazine, the upper ends of the slide lifters 51 may be slotted, as shown at 86, to receive the opposite side edges of the master slide which is thus connected to and supported by the slide lifters, and always moved upward and downward therewith, irrespective of any propelling action of the underlying slide projected from the magazine.

Any ordinary pictures or photographs, printed matter, cards, transparencies, lantern slides and the like may be successively displayed by means of the machine hereinabove described, and by means of suitable devices for projecting rays of light, transparencies may be displayed at night and may be projected upon a screen at any suitable distance from the machine, the machine after being once set in motion being entirely automatic, and not needing the services of an operator.

As shown in Fig. 14, where a picture or lantern slide or transparency is smaller than the slide frame, a reducer or dummy plate 87 may be placed in the holder and provided with a small opening 88 of a size suitable to receive the particular plate or picture to be displayed.

What is claimed is:

1. An advertising device, comprising a frame, a revolving magazine provided with guide-ways, slides mounted in said guide ways, means for imparting intermittent movement to the magazine, means for projecting the slides from the magazine while the latter is at rest, locking bolts for engaging the slides, and means for automatically shifting said bolts.

2. An advertising device, comprising a frame, a revolving magazine provided with guide-ways, slides mounted in said guide ways, means for imparting intermittent movement to the magazine, means for projecting the slides from the magazine while the latter is at rest, locking bolts movable transversely of the magazine, and means for shifting said bolts into and out of engagement with the slides.

3. An advertising device, comprising a frame, a revolving magazine provided with guide-ways, slides mounted in said guide ways, means for imparting intermittent movement to the magazine, means for projecting the slides from the magazine while the latter is at rest, locking bolts carried by the magazine, and stationary cams for shifting said bolts into and out of engagement with the slides.

4. An advertising device, comprising a frame, a revolving magazine provided with guide-ways, slides mounted in said guide ways, means for imparting intermittent movement to the magazine, means for projecting the slides from the magazine while the latter is at rest, keepers on the slides, locking bolts on the magazine, and means for shifting said bolts into and out of engagement with the said keepers.

5. An advertising device, comprising a frame, a revolving magazine provided with guide-ways, slides mounted in said guide ways, means for imparting intermittent movement to the magazine, means for projecting the slides from the magazine while the latter is at rest, locking means carried by the magazine for holding the slides in the magazine, and means for unlocking each slide as it approaches its point of operation.

6. An advertising device, comprising a frame, a revolving magazine provided with guide ways, slides mounted in said guide ways, means for imparting intermittent movement to the magazine, means for projecting the slides from the magazine while the latter is at rest, locking elements carried by the magazine, and means on the frame operating in conjunction with said locking elements to unlock each slide as it approaches its point of operation and again lock the slide after its return to its initial position.

7. An advertising device, comprising a frame, a revolving magazine provided with guide-ways, slides mounted in said guide ways, means for imparting intermittent movement to the magazine, and means for projecting the slides from the magazine while the latter is at rest, comprising a rotary drive wheel, oppositely arranged slide lifters, a crank shaft to which the lifters are connected, and a lever geared to said crank shaft and actuated intermittently by said drive wheel.

8. An advertising device, comprising a frame, a revolving magazine provided with guide ways, slides mounted in said guide ways, means for imparting intermittent movement to the magazine, and means for projecting the slides from the magazine while the latter is at rest, comprising a rotary drive wheel, oppositely arranged slide lifters, a crank shaft to which the slide lifters are connected, and a crank shaft operating lever intermittently actuated by the drive wheel.

9. An advertising device, comprising a frame, a revolving magazine provided with guide-ways, slides mounted in said guide ways, means for imparting intermittent movement to the magazine, comprising a rotary drive wheel, a lever actuated by said wheel, a magazine feeding dog actuated by said lever, and means for tripping said dog and causing it to release the magazine, and means for projecting the slides from the magazine while the latter is at rest.

10. An advertising device, comprising a frame, a revolving magazine provided with guide-ways, slides mounted in said guide ways, means for imparting intermittent movement to the magazine, comprising a rotary drive wheel, a lever actuated by said wheel, a magazine feeding dog actuated by said lever, and means on the drive wheel for tripping said dog and causing it to release the magazine, and means for projecting the slides from the magazine while the latter is at rest.

In testimony whereof I affix my signature in presence of two witnesses.

OSCAR C. BERNARD.

Witnesses:
JOHN H. HARPER,
R. H. BROWN.

---

Copies of this patent may be obtained for five cents each, by addressing the "Commissioner of Patents, Washington, D. C."